(12) United States Patent
Werthiem et al.

(10) Patent No.: US 7,356,171 B2
(45) Date of Patent: Apr. 8, 2008

(54) SYSTEMS AND METHODS RELATING TO AFIS RECOGNITION, EXTRACTION, AND 3-D ANALYSIS STRATEGIES

(75) Inventors: Kasey Werthiem, Bridgeport, WV (US); Jeff Walajtys, Schenectady, NY (US)

(73) Assignee: LumenIQ, Inc., Bellingham, WA (US)

( * ) Notice: Subject to any disclaimer, the term of this patent is extended or adjusted under 35 U.S.C. 154(b) by 0 days.

(21) Appl. No.: 11/528,479

(22) Filed: Sep. 26, 2006

(65) Prior Publication Data

US 2007/0165914 A1    Jul. 19, 2007

Related U.S. Application Data

(63) Continuation of application No. 10/964,554, filed on Oct. 12, 2004, now Pat. No. 7,116,806.

(60) Provisional application No. 60/604,092, filed on Aug. 23, 2004, provisional application No. 60/582,414, filed on Jun. 23, 2004, provisional application No. 60/572,665, filed on May 19, 2004, provisional application No. 60/562,635, filed on Apr. 14, 2004, provisional application No. 60/548,214, filed on Feb. 27, 2004, provisional application No. 60/518,263, filed on Nov. 7, 2003, provisional application No. 60/517,849, filed on Nov. 6, 2003, provisional application No. 60/513,669, filed on Oct. 23, 2003.

(51) Int. Cl.
*G06K 9/00* (2006.01)
*G06K 9/40* (2006.01)

(52) U.S. Cl. ............... 382/124; 382/154; 382/254

(58) Field of Classification Search .......... 382/115, 382/124, 125, 154, 254, 256, 298, 299; 283/67, 283/68, 69, 70; 340/5.8, 5.83; 396/15; 356/71
See application file for complete search history.

(56) References Cited

U.S. PATENT DOCUMENTS

| | | | |
|---|---|---|---|
| 4,024,500 A | 5/1977 | Herbst et al. | 340/146.3 |
| 4,561,066 A | 12/1985 | Emmons et al. | 364/736 |
| 4,709,231 A | 11/1987 | Sakaibara et al. | 340/729 |
| 4,808,988 A | 2/1989 | Burke et al. | 340/744 |
| 4,835,712 A | 5/1989 | Drebin et al. | 364/518 |
| 5,251,265 A | 10/1993 | Dohle et al. | 382/3 |
| 5,347,589 A | 9/1994 | Meeks et al. | 382/3 |
| 5,359,671 A | 10/1994 | Rao | 382/15 |
| 5,369,737 A | 11/1994 | Gholizadeh et al. | 395/126 |
| 5,524,069 A * | 6/1996 | Inoue | 382/270 |
| 5,633,728 A | 5/1997 | Tachihara et al. | 358/429 |
| 5,666,443 A | 9/1997 | Kumashiro | 382/266 |

(Continued)

OTHER PUBLICATIONS

International Search Report, PCT/US04/34104, Jun. 16, 2005.
MS MacroSystem, Printout from http://www.msmacrosystem.nl/index.html, 3D Surface View Software, pp. 1-2, Copyright 1999-2003.

(Continued)

*Primary Examiner*—Yon J. Couso
(74) *Attorney, Agent, or Firm*—Graybeal Jackson Haley LLP

(57) ABSTRACT

Systems, methods, etc., that that assist a print examiner to thoroughly search and compare a print or substantial portion thereof against a known print database contained within an AFIS system. In certain embodiments, the prints can be definitively matched to a corresponding same print in the database. A result of a more thorough search and comparison can be a higher hit score and accuracy rate. In certain embodiments, the database comprises a candidate list of previously obtained prints to assist in the identification.

19 Claims, 13 Drawing Sheets

U.S. PATENT DOCUMENTS

| | | | | |
|---|---|---|---|---|
| 5,730,602 | A | 3/1998 | Gierhart et al. | 434/155 |
| 5,740,273 | A | 4/1998 | Parthasarathy et al. | 382/187 |
| 5,774,582 | A | 6/1998 | Gat et al. | 382/186 |
| 5,832,134 | A | 11/1998 | Avanish et al. | |
| 5,926,555 | A | 7/1999 | Ort et al. | |
| 5,949,428 | A | 9/1999 | Toelle et al. | 345/431 |
| 6,160,914 | A | 12/2000 | Muroya | 382/187 |
| 6,185,444 | B1 | 2/2001 | Ackerman et al. | 600/410 |
| 6,195,447 | B1 | 2/2001 | Ross | |
| 6,389,169 | B1 | 5/2002 | Stark et al. | 382/225 |

OTHER PUBLICATIONS

MS MacroSystem, Printout from http://www.msmacrosystem.nl/Forensic/Software.html, 2D/3D Forensic Software, pp. 1-2, Copyright 1999-2003.

MS MacroSystem, Printout from http://www.msmacrosystem.nl/3Dsurf/About3Dview.html, 3D Surface View: Fast Scientific Visualization, pp. 1-2, Copyright 1999-2003.

ReindeerGraphics.com, Printout from http://www.reindeergraphics.com/, Quantitive Image Analysis, pp. 1-3, Copyright 1995-2003.

ReindeerGraphics.com, Printout from http://www.reindeergraphics.com/foveapro2/, Fovea Pro 2.0, pp. 1-3, Copyright 1995-2003.

ReindeerGraphics.com, Printout from http://reindeergraphics.com/foveapro2/surface.shtml, Fovea Pro: Surface Analysis, pp. 1-3, Copyright 1995-2003.

Freid, Glenn and Grosser, Benjamin, University of Illinois at Urbana-Champaign, Beckman Institute for Advances Science and Technology Annual Report, 2001.

Top2maya, Printout from http://www.itg.uiuc.edu/technology/visualization/top2maya/Doc.htm, Rob Gillespie, Visualization, A Tool for Converting 2D Topographical Maps to 3D Models, pp. 1-12, 2001.

Richard A. Dusak; "The Forensic Information System for Handwriting (FISH)"; presentation material for Amerian Academy of Forensic Sciences annual meeting Feb. 15-20, 1993; 17 pages.

Communication Intelligence Corporation; "Sign-it", sales literature; Copyright dates 2000, 2001; 3 pages.

SG Tech; PenOp; Easy Software, Sales Literature; Copyright 1999,2000; 3 pages.

Pikaso Software, Inc.; "Write-On—Handwriting Comparison Software", sales literature; undated; 2 pages.

Sheila Lowe and Associates; "The Write Choice—Handwriting Analysis Software for Windows", web site literature printed Oct. 28, 2001 and Oct. 25, 2001; 23 pages.

Image Metrology Aps; "scanning Probe Image Processor (SPIP) for Windows"; Sales literature; Oct. 17, 2001; 4 pages.

National Instruments; "LabVIEW"; brochure and seminar information; copyright dates 1999 and 2000; 4 pages.

Sensor Products, Inc.; "TOPAQ the Tactical Force Analysis System"; sales literature; copyright date 2000; 6 pages.

Image Content Technology LLC; "lucis DHP Algorithm" Technical Overview; Copyright date 1999, 39 pages.

Media Cybemetics; "Image Pro PLUS The Proven Solution"; web site literature; printed OCt. 18, 2001; 8 pages.

Kitware: "Visualization Toolkit"; web site literature; printed Oct. 23, 2001, 2 pages.

* cited by examiner

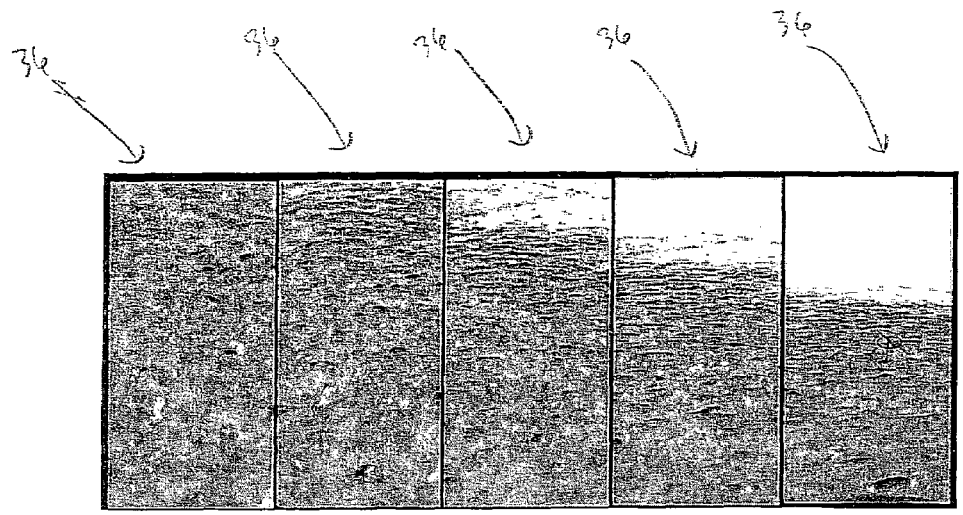
FIG. 3
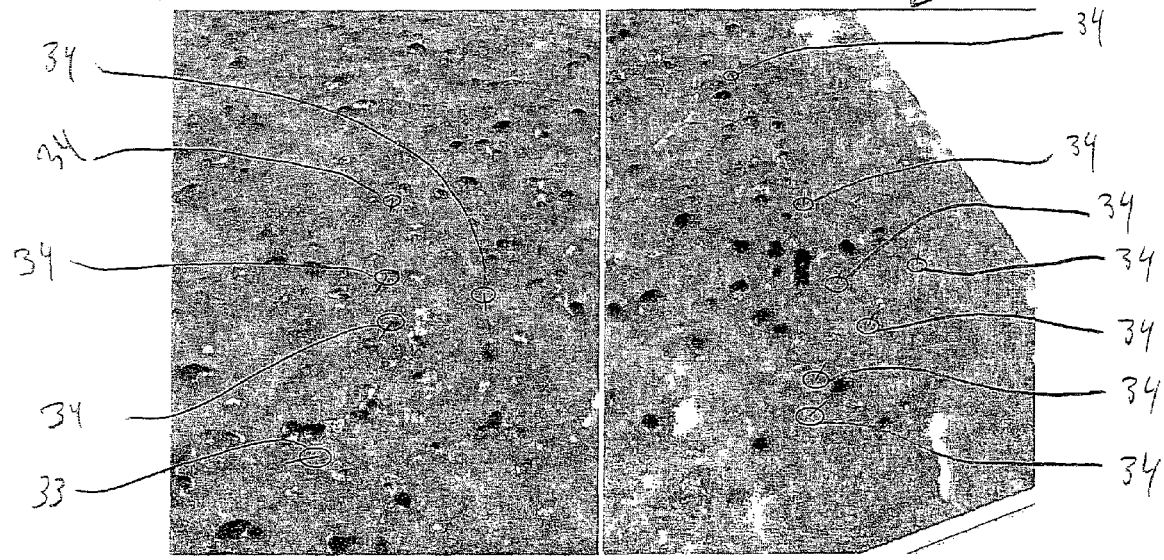
FIG. 4
FIG. 5

|  | 10 known prints | | 100 known prints | | 1000 known prints | |
|---|---|---|---|---|---|---|
|  | 1 slice | 250 slices | 1 slice | 250 slices | 1 slice | 250 slices |
| level 2 | 10 |  | 100 |  | 1000 |  |
| level 3 | 10 | 250 | 100 | 25000 | 1000 | 250000 |
| level 3 25 slices | 25 | 62500 | 2500 | 625000 | 25000 | 6250000 |
| level 3 250 slices | 250 | 625000 | 25000 | 6250000 | 250000 | 62500000 |

SYSTEMS AND METHODS RELATING TO AFIS RECOGNITION, EXTRACTION, AND 3-D ANALYSIS STRATEGIES

CROSS-REFERENCE TO RELATED APPLICATIONS

The present application claims priority from U.S. patent application No. 10/964,554, filed Oct. 12, 2004, now U.S. patent No. 7,116,806, which claims priority from U.S. provisional patent application No. 60/513,669, filed Oct. 23, 2003; U.S. provisional patent application No. 60/517,849, filed Nov. 6, 2003; U.S. provisional patent application No. 60/518,263, filed Nov. 7, 2003; U.S. provisional patent application No. 60/548,214, filed Feb. 27, 2004; U.S. provisional patent application No. 60/562,635, filed Apr. 14, 2004; U.S. provisional patent application No. 60/572,665, filed May 19, 2004; U.S. provisional patent application No. 60/582,414, filed Jun. 23, 2004; and, U.S. provisional patent application No. 60/604,092 filed Aug. 23, 2004; which are incorporated herein by reference in their entirety and for all their teachings and disclosures.

BACKGROUND

Automated Fingerprint Identification Systems (AFIS) systems, http://onin.com/fp/afis/afis.html, have not traditionally been able to search and match all fingerprints that human examiners can identify through manual methods. In part this is because human latent print examiners can use additional detail, such as level III detail, to match fingerprints (as used herein, "print" refers to unique identifying prints on an animal, typically a human, such as fingerprints, palm prints, toe prints, foot prints, etc.). At the same time, the physical limitations of the human eye prevent human examiners from distinguishing between very fine levels of grayscale magnitudes, which interferes both with identification of locations for, and the accuracy of, minutiae markers in each of level I, II and III details in fingerprints. Level 3 detail is the finest-detail of the three levels. Generally speaking, level 1 is directed to ridge flow in prints, level 2 to ridge path in prints, and level 3 to ridge shape, which comprises unique edge detail, pore shape and position, incipient ridge shape, and other detail smaller than a ridge width. Thus, existing systems do not always allow AFIS systems, operators and examiners to account for, and mark as minutia points, features that can be accurately discerned by visualizing subtle differences in grayscale magnitude in a fingerprint image.

AFIS systems have not been developed to recognize, extract, quantify, search, and match level III characteristics in two or more fingerprint images. AFIS systems also have not developed the capacity to identify and mark desired minutiae markers at level III detail. Without this capability, subtle grayscale magnitude differences cannot be thoroughly analyzed, and therefore certain features may not be recognized, extracted, quantified, searched, and/or matched. Moreover, AFIS III detail may reside at different grayscale magnitudes (or other magnitudes such as hue or saturation) in a fingerprint image. If grayscale magnitudes are not considered, certain level III features may not be recognized, extracted, quantified, searched, and/or matched. (Note: AFIS III is often used as shorthand herein to indicate level III analysis of prints whether actually performed on in an automated system or manually.)

Thus, there has gone unmet a need for additional AFIS system tools to assist in distinguishing between features that reside at different grayscale magnitudes, and to mark those features in a manner that can be searched on the AFIS system. The present systems, methods, etc., provide these and other advantages.

SUMMARY

The present systems and methods are, in some embodiments, referred to herein as AFIS 3-D or AFIS III+ for various embodiments, and assist an examiner to thoroughly-search and compare a print or substantial portion thereof against a known print database contained within an AFIS system. The substantial portion comprises enough of the print to be able to identify adequate features to search and compare with the print against a known print database, and in some embodiments comprises enough of the print to at least tentatively match the print with at least one of the known prints. In certain embodiments, the prints can be definitively matched to a corresponding same print in the database. A result of a more thorough search and comparison can be a higher hit score and accuracy rate. In certain embodiments, the database comprises a candidate list of previously obtained prints to assist in the identification.

One significant benefit provided herein is more accurate comparison of latent print to known print images ("print" includes prints of any appropriate body part, such as lips, skin, fingerprints, palm prints, toe prints, etc.). For example, a bomb fragment may contain only one small partial latent print. The more accurate AFIS 3-D and/or III+ systems can be more likely to result in an identification of the source of the latent print based on a search against a database of prints/images.

The present innovation can help to identify and neutralize threats to national homeland security, whether those threats are foreign or domestic, for example by searching an image/print in a more accurate manner using subtle grayscale and/or other magnitudes in that image to create more comprehensive and accurate AFIS markers such as minutiae markers (AFIS level 2 or 3 markers), and/or by searching an image/print multiple times using different magnitudes in that image to create different pathways which are then used to recognize, extract, quantify, search, and match a comprehensive set of level III features.

Thus, in some embodiments the methods and related software and other systems herein comprise analyzing prints comprising: a) providing an at least 2-dimensional image of a print; b) subjecting the image to magnitude enhancement analysis such that at least one relative measurement across at least a substantial portion of the print can be depicted in an additional dimension relative to the at least 2-dimensions to provide a magnitude enhanced image such that additional levels of that magnitude can be substantially more cognizable to a human eye compared to the 2-dimensional image without the magnitude enhancement analysis; c) displaying the enhanced image; and d) manually reviewing the magnitude enhanced image to place at least one minutia marker on the print.

The placing can comprise identifying and placing at least one, two or more minutiae markers not previously identified on the print, and can comprise moving at least one, two or more minutiae markers previously, incorrectly placed on the print.

The methods can also comprise analyzing prints, comprising: a) providing an at least 2-dimensional image of a print comprising minutiae markers determined by an automated minutia marker algorithm to provide automated minutiae markers; b) subjecting the image to magnitude enhancement analysis such that at least one relative magnitude across at least a substantial portion of the print can be depicted in an additional dimension relative to the at least 2-dimensions to provide an magnitude enhanced image such that additional levels of the chosen measure or magnitude can be visible to a human eye compared to the 2-dimensional image without the magnitude enhancement analysis; c) displaying the enhanced image; and d) manually reviewing the magnitude enhanced image to evaluate the correctness of the automated minutiae markers. The methods can further comprise placing at least one minutia marker of the print, the placing comprising at least one of removing incorrect automated minutiae markers, moving incorrect automated minutiae markers, or adding further minutiae markers.

In another aspect, the methods herein comprise analyzing prints comprising: a) providing an at least 2-dimensional image of a print; b) subjecting the image to magnitude enhancement analysis such that at least one relative magnitude across at least a substantial portion of the print is depicted in an additional dimension relative to the at least 2-dimensions to provide a magnitude enhanced image such that additional levels of magnitude are visible to a human eye compared to the 2-dimensional image without the magnitude enhancement analysis; c) dividing the magnitude enhanced image into a plurality of intensity levels; d) individually selecting at least one isolated intensity level; and e) determining at least one AFIS marker from the isolated intensity level. The methods can further comprise displaying the isolated level and manually or automatically determining the at least one minutia marker.

These and other aspects, features and embodiments are set forth within this application, including the following Detailed Description and figures. Unless expressly stated otherwise or clear from the context, all embodiments, aspects, features, etc., can be mixed and matched, combined and permuted in any desired manner. In addition, various references are set forth herein that discuss certain systems, apparatus, methods and other information; all such references are incorporated herein by reference in their entirety and for all their teachings and disclosures, regardless of where the references may appear in this application.

BRIEF DESCRIPTION OF THE FIGURES

FIGS. 3-5 are a series of screen shots of a portion of the image in FIGS. 1 and 2 demonstrating dynamic views of 3-dimensional ridge shape wherein the z-axis indicates grayscale magnitudes.

FIG. 12b depicts an AFIS II system reading ridge paths and based on major ridge path deviations.

DETAILED DESCRIPTION

AFIS 3-D Visualization Methods and Systems

When the full range of grayscale values in a fingerprint image are thoroughly analyzed by a human examiner, the placement of markers on the image that occurs as part of an AFIS system search will be more accurate. A series of markers that have been placed more accurately, and/or in greater number, than would be possible absent analysis of the full range of grayscale or other magnitudes, may increase the chances of an AFIS hit.

Two problems with current AFIS analysis modules (which do not permit analysts to place minutiae markers based on grayscale magnitudes visualized on a 3-D surface) is that all relevant features present in an impression may not be recognized by the examiner, or the exact position of some features may not be correctly determined. Software and systems that overcome the human visual system's weakness at discerning image grayscale magnitudes, by portraying those values as a 3D surface, assists a fingerprint examiner to discern very subtle variations in image grayscale magnitudes and place AFIS markers in the correct location and position.

AFIS systems generally recognize detail in two ways: 1) automatic, system-generated placement of fingerprint minutiae markers, and 2) placement of minutiae markers by human analysts. In addition, the human examiner can place additional markers on a print image to supplement markers automatically generated by the AFIS system, and vice-versa, and the human examiner can move or delete improper markers on the print image to correct improper markers generated automatically by the AFIS system. AFIS 3-D and AFIS III+ assist in the human detection and placement of detail and minutia markings in a fingerprint image or other print image, thereby resulting in improved results in the AFIS search.

Figure 1:
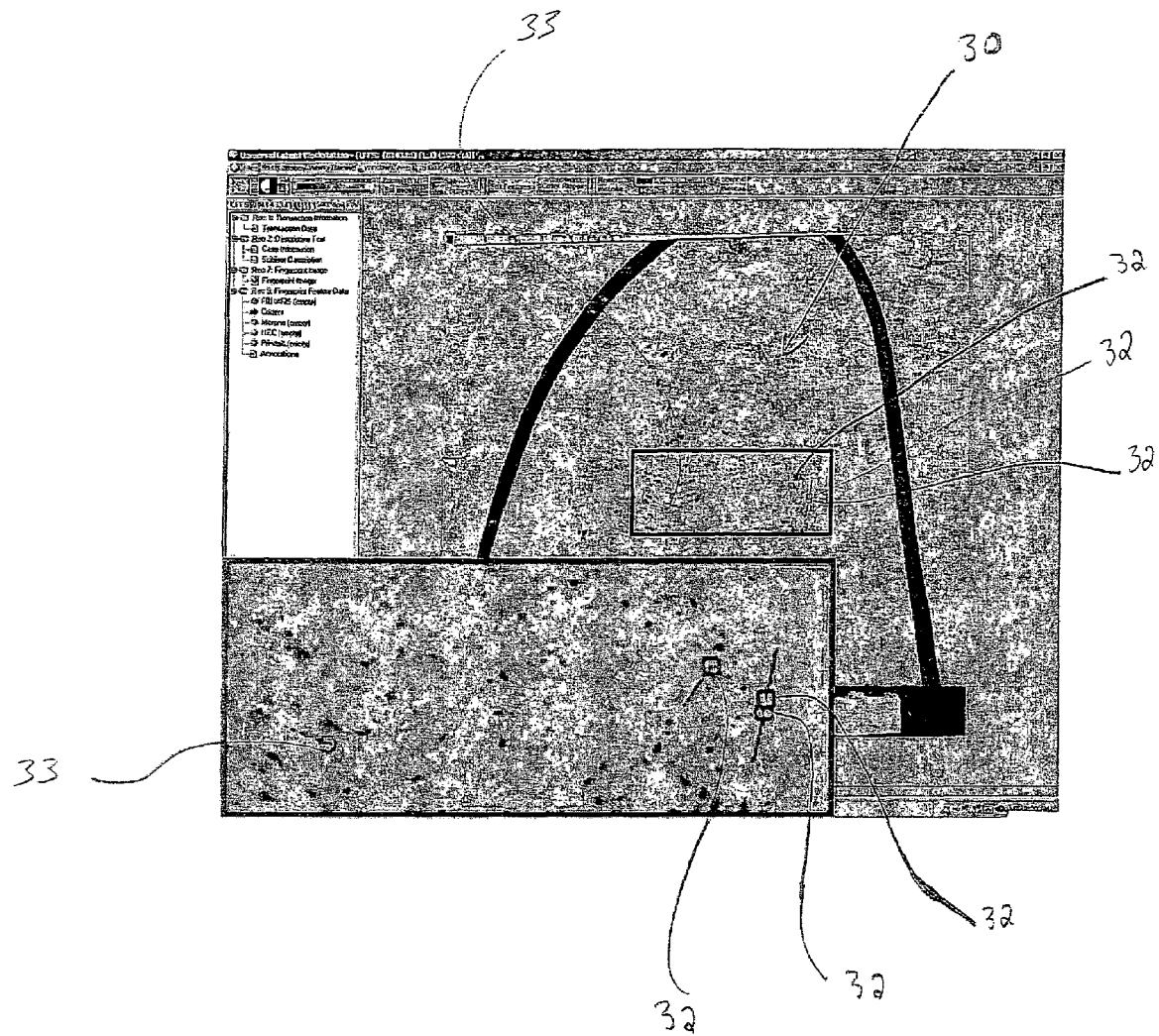
FIG. 1 is a screen shot of an image of a print being analyzed according to methods herein. The image comprises 4 automatically extracted features, only 1 is correct. The other 3 features (on the right) are not correct.

In FIG. 1, a latent print 30 was processed through the automatic extraction and minutia placement feature of a Universal Latent Workstation (ULW). This software is used by law enforcement agencies nationwide to submit latent print searches to the FBI IAFIS system. The three minutiae markers 32 on the right side of the impression do not accurately reflect ridge structure underneath the marking. They are incorrect. The minutia marker 33 on the left is correct By visualizing this impression as a 3-D surface, preferably dynamically (i.e., where the 3-D surface can be rolled, tilted and panned, also known as pitched, yawed and/or rolled, and can even be incorporated into a cine loop such that the 3-D surface is pitched, yawed and/or rolled in a reiterative manner), the ridge path in this area can be followed through this area without splitting or coming to an end.

Figure 2:
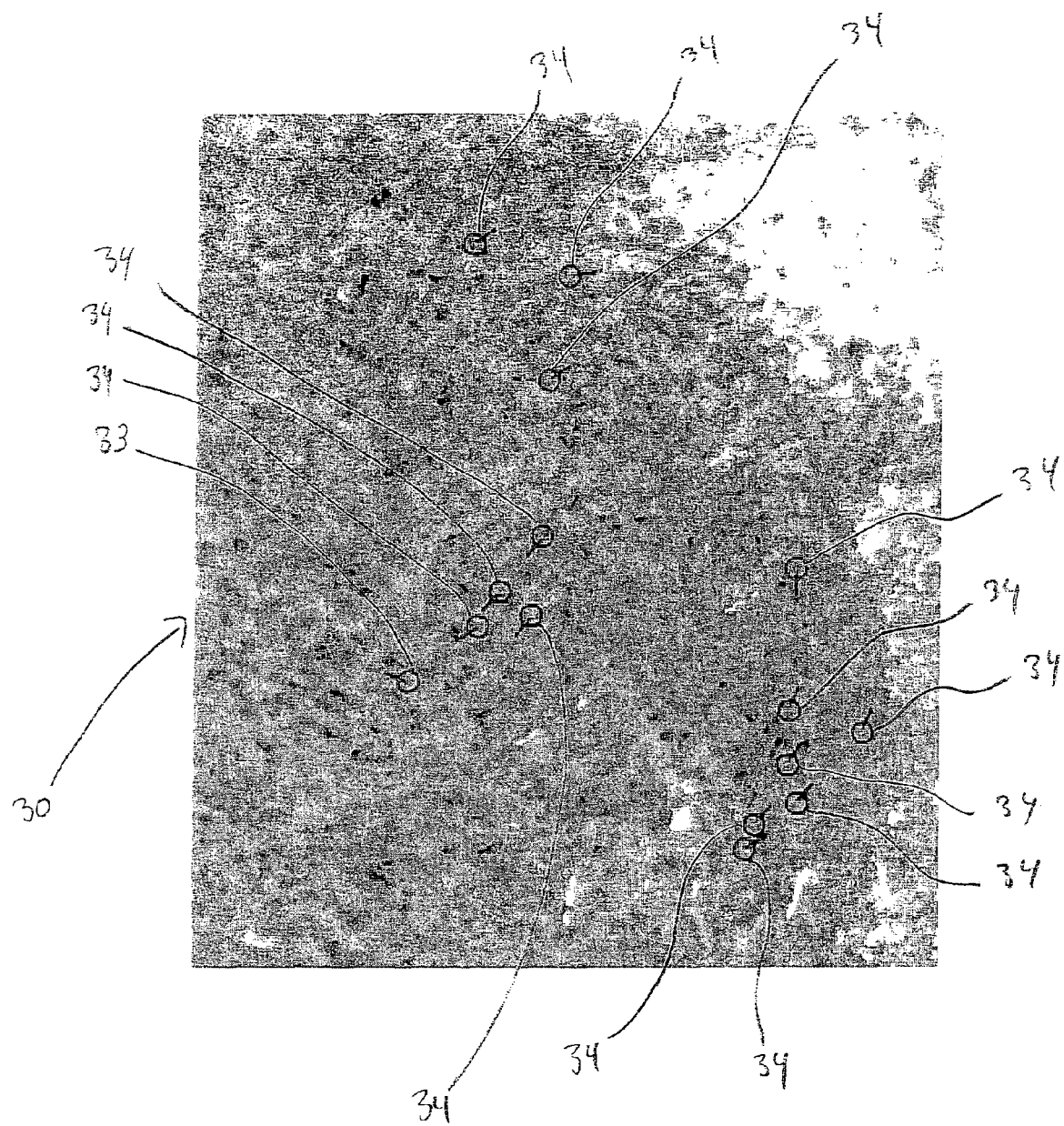
FIG. 2 depicts the same latent print as FIG. 1 rendered using software that depicts image intensity characteristics as a 3D surface.

In FIG. 2, the same latent print was rendered in software that depicts image intensity characteristics as a 3D surface. In particular, the digital image of FIG. 1 was provided for rendering, then the image was subjected to intensity value enhancement analysis such that at least one relative intensity value across at least a substantial portion of the print was depicted in an additional dimension relative to the at least 2-dimensions. This provided an intensity value enhanced image such that additional levels of intensity values were substantially more cognizable to a human eye compared to the 2-dimensional image without the intensity value enhancement analysis. Cognizable indicates that in some embodiments the feature was not visible without the enhancement, but in other embodiments the feature was visible without the enhancement but was substantially more cognizable, or more quickly cognizable, as a feature with the enhancement. Through a detailed examination of this nature, many more correct characteristics were visualized, and additional AFIS minutiae markers 34 were plotted. In FIG. 2, for example, 15 characteristics were visualized on the dynamic 3D surface map and plotted with minutiae markers 34 on the image.

FIGS. 3-5 are a series of screen shots of a portion 36 of the image in FIGS. 1 and 2 demonstrating dynamic (pan, tilt or roll) AFIS 3-D analyses of a 3-dimensional ridge shape wherein the z-axis indicates grayscale magnitudes, giving the examiner more information to visualize and therefore creating an opportunity to place more minutiae markers, and do so with more accuracy. In certain embodiments in this and other aspects of the invention, the image or desired portions thereof can also be enlarged (zoomed), reduced, etc.

The additional, correctly placed minutiae markers depicted in FIG. 2, when saved into the file format used by an AFIS system, are then searched against the system's fingerprint database, using an AFIS system's matching algorithms. The AFIS system then generates a report on the probability of a match, and if so matched, assigns a relative score on the strength of that probability. As a general rule, the higher the number of correct minutiae markers, (i) the greater the probability that an AFIS "hit" will occur, and (ii) the higher the "confidence level" score that is issued by an AFIS system for each hit.

The AFIS extra-dimension systems, devices, methods, etc., herein could be used in a variety of configurations, including the following (this list is illustrative not exclusive):

1. Adding/using a 3-D visualization tool at the "pre-AFIS" stage of an existing AFIS system. This assists the examiner to view the fingerprint image in 3-D (e.g., the z-axis of the surface representing grayscale magnitudes), plot AFIS minutiae markers on the 3D surface, and then submit the minutiae markers to the AFIS system for search.
2. As a variation of 1 above, the 3-D visualization tool also assists the examiner to (a) add additional minutia after the AFIS system has automatically generated minutiae and (b) adjust the minutia placed by the AFIS system's automatic placement feature.
3. For level III detail contained in a print, the 3-D visualization of grayscale and other magnitudes herein assists in the placement of minutiae.

Figure 6:
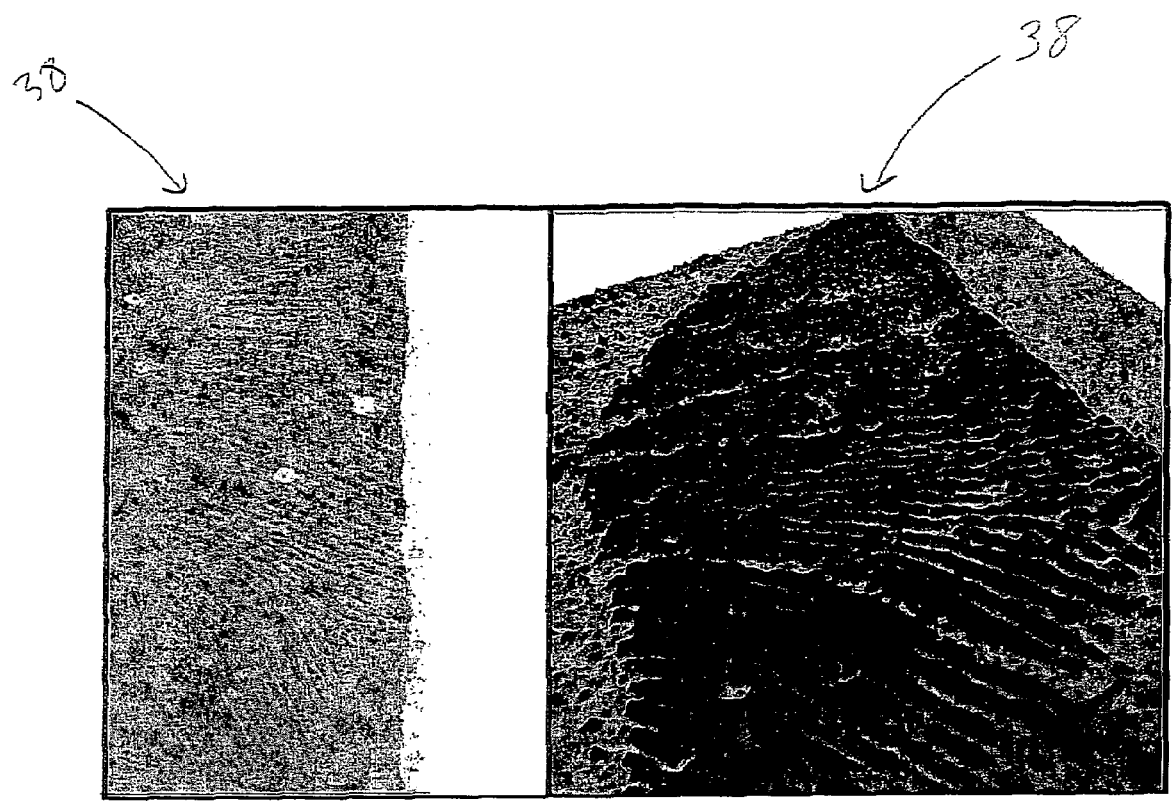
FIG. 6 is a screen shot of a 2D palm print rendered normally and with an intensity magnitudes shown on an additional dimension.

The 3-D visualization tool also applies to Automated Palmprint Identification Systems and other print-based identification systems, as exhibited for example in FIG. 6, which shows a 2D palm print 38 rendered normally (i.e., in 2D) and in 3D with the grayscale magnitude demonstrated on an additional dimension, an embodiment of the systems and methods discussed herein, for a more detailed 3D examination. Palm prints and fingerprints are both comprised of friction ridge skin and are searched in a similar fashion. Other desired prints, typically human, can also be imaged and used with the methods and systems herein, for example toe prints, foot prints, non-ridged skin prints, etc.

FIGS. 7-11 show screen shots of an embodiment of the AFIS 3D minutiae marking software, and illustrate exemplary steps taken to mark ridge endings and bifurcations (level II detail).

Figure 7:
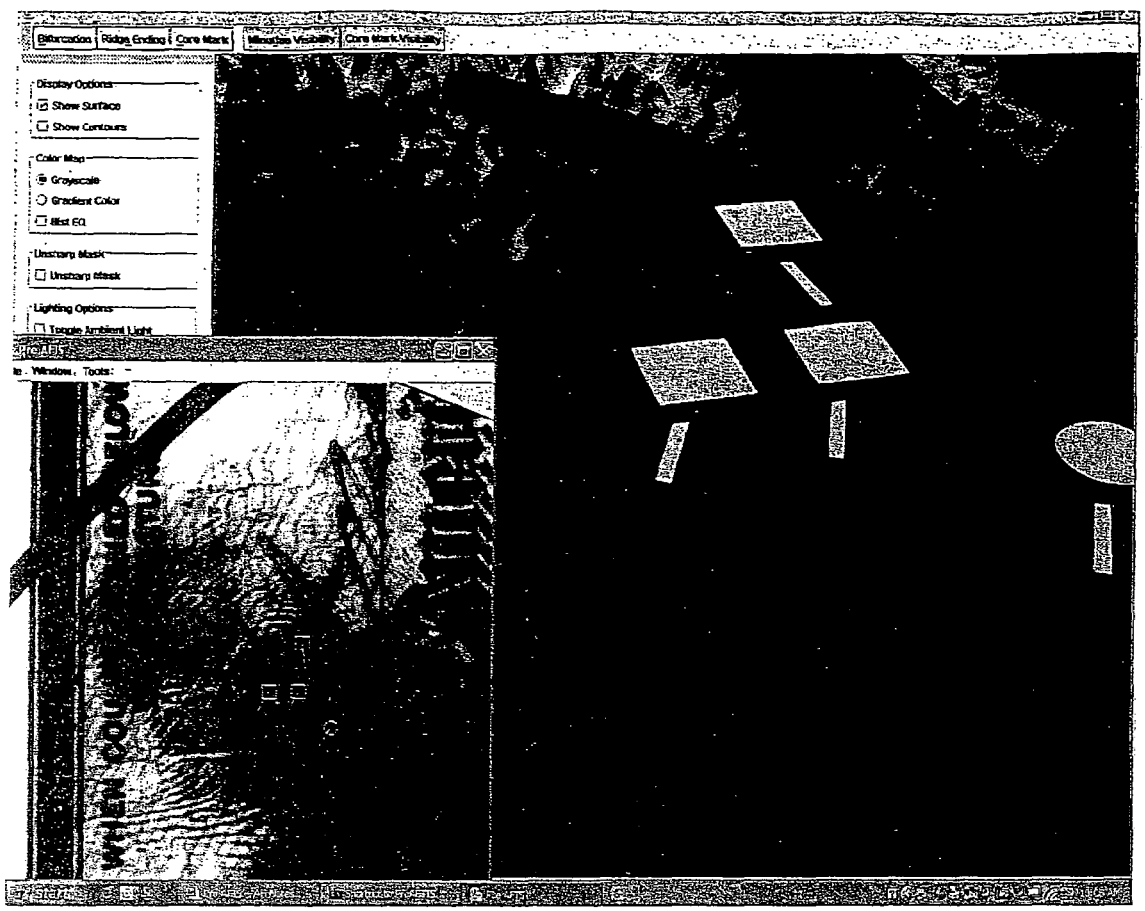
FIG. 7 is a screenshot of a fingerprint plotted with an embodiment of the 3D minutia marking tools discussed herein.

FIG. 7 is a screenshot of a fingerprint being plotted with an embodiment of the 3D minutiae marking tools discussed herein. As can be seen in FIG. 7 (and in some other figures), in some embodiments the placement of minutiae markers on the 3D image can be simultaneously displayed on the 2D image. If desired, as shown, the 2D image can be an inset next to or within the 3D image, or the images can be side-by-side, or otherwise located as desired.

Figure 8:
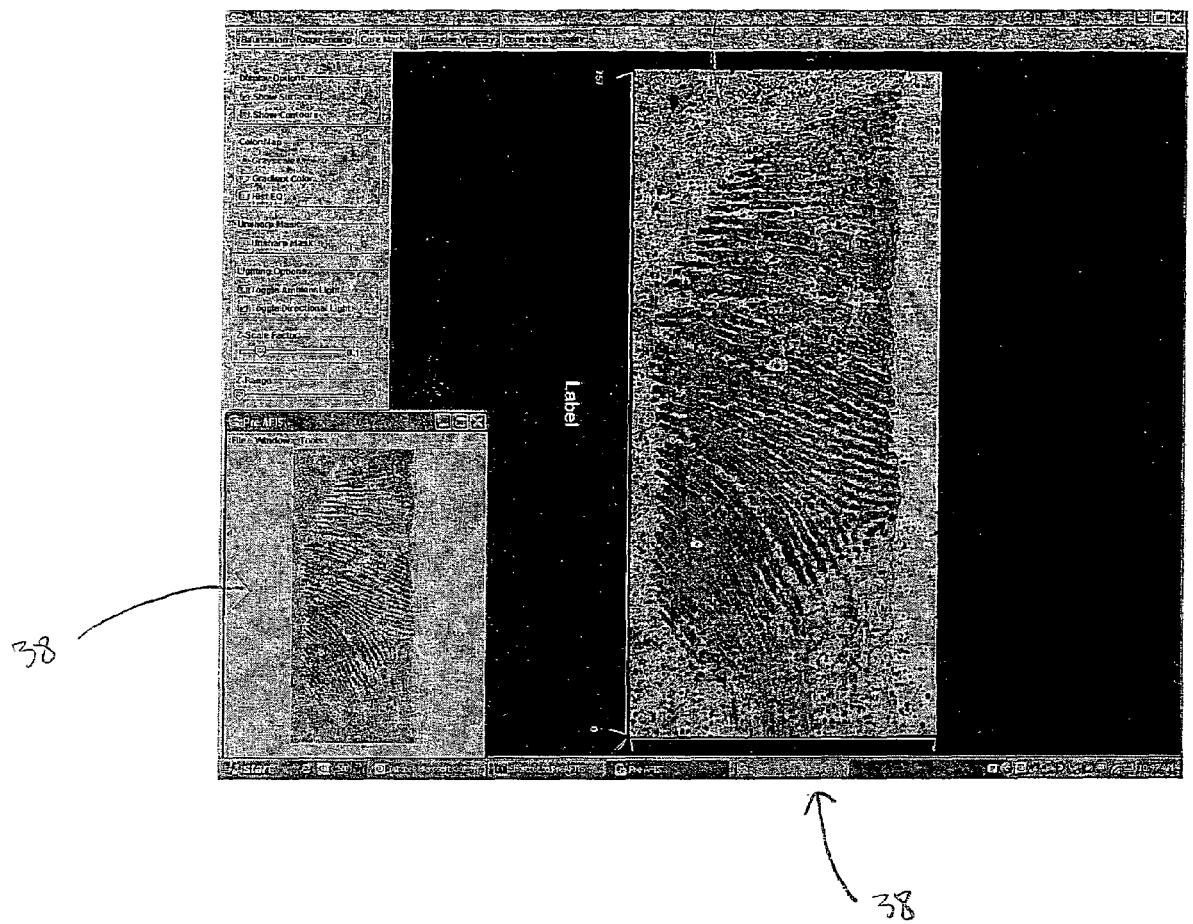
FIG. 8 depicts the same palm print as FIG. 6, going through the minutia marking process.

Next, FIG. 8 depicts the same palm print image 38 as FIG. 6, going through the minutia marking process. The first image represents a 2D latent palm print opened in minutia plotting software. When minutia are placed in the 3D image, they automatically appear on the corresponding spot on the 2D image to the left.

Figure 9:
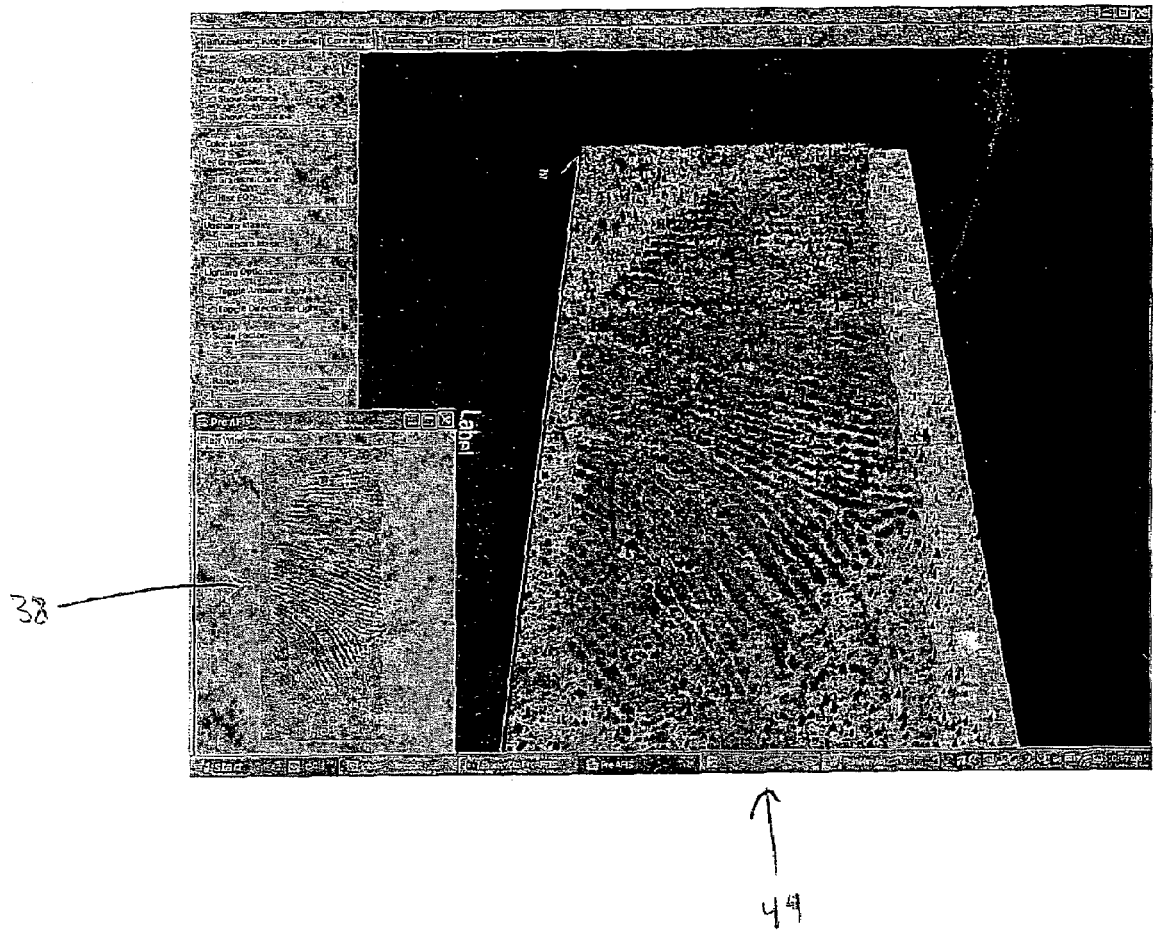
FIG. 9 depicts the same palm print as FIG. 6 undergoing roll, tilt and pan.

FIG. 9 depicts the same palm print image 38 as FIG. 6, showing the image undergoing rotation, skew, roll, etc., in any direction to facilitate an in-depth 3 dimensional examination of ridge structure 44.

Figure 10:
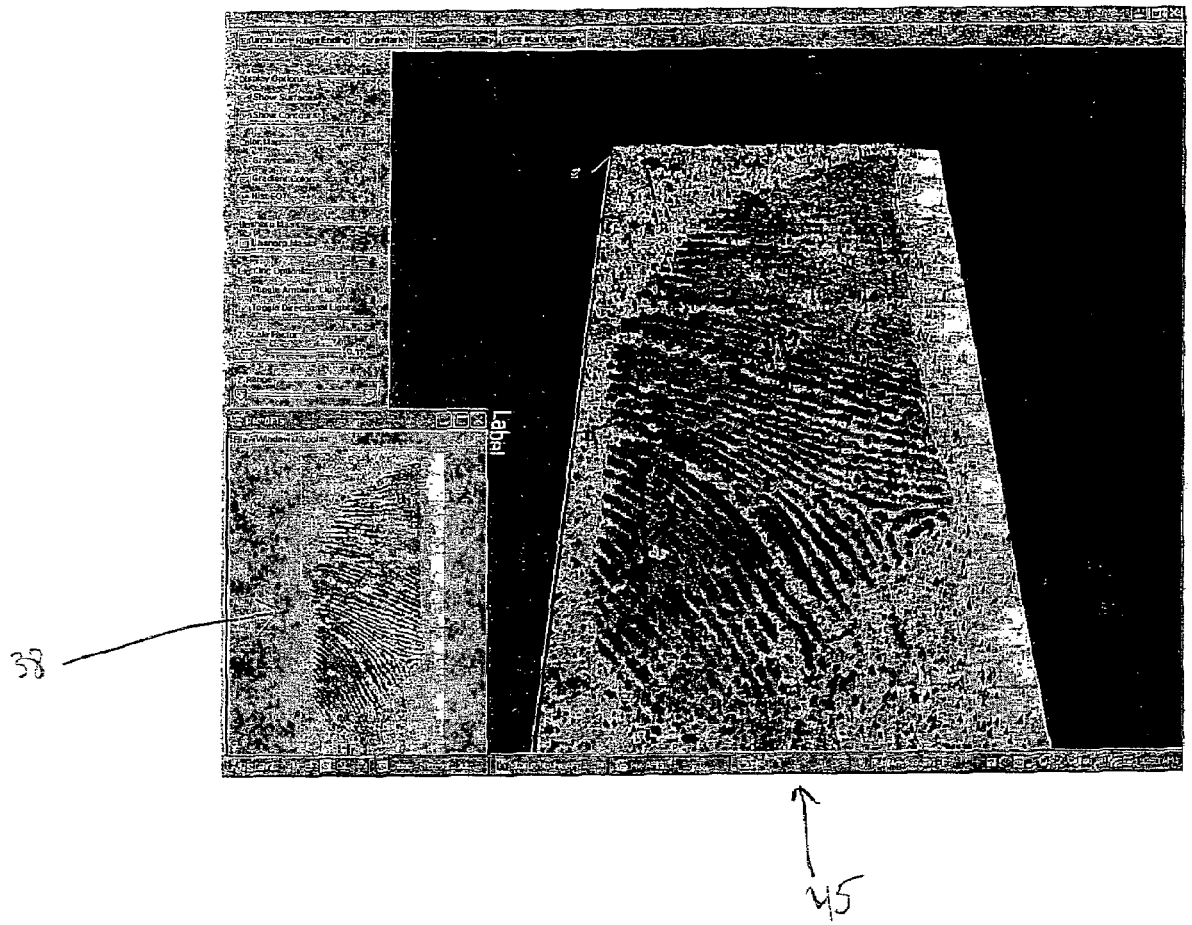
FIG. 10 depicts the same palm print image as FIG. 6 viewed through enhancement filters such as contrast adjustments further increase visual clarity.

FIG. 10 depicts the same palm print image 38 as FIG. 6 viewed through enhancement filters such as contrast adjustments to provide a filtered image 45. Such filters can be used at any desired time to further increase visual clarity.

Figure 11:
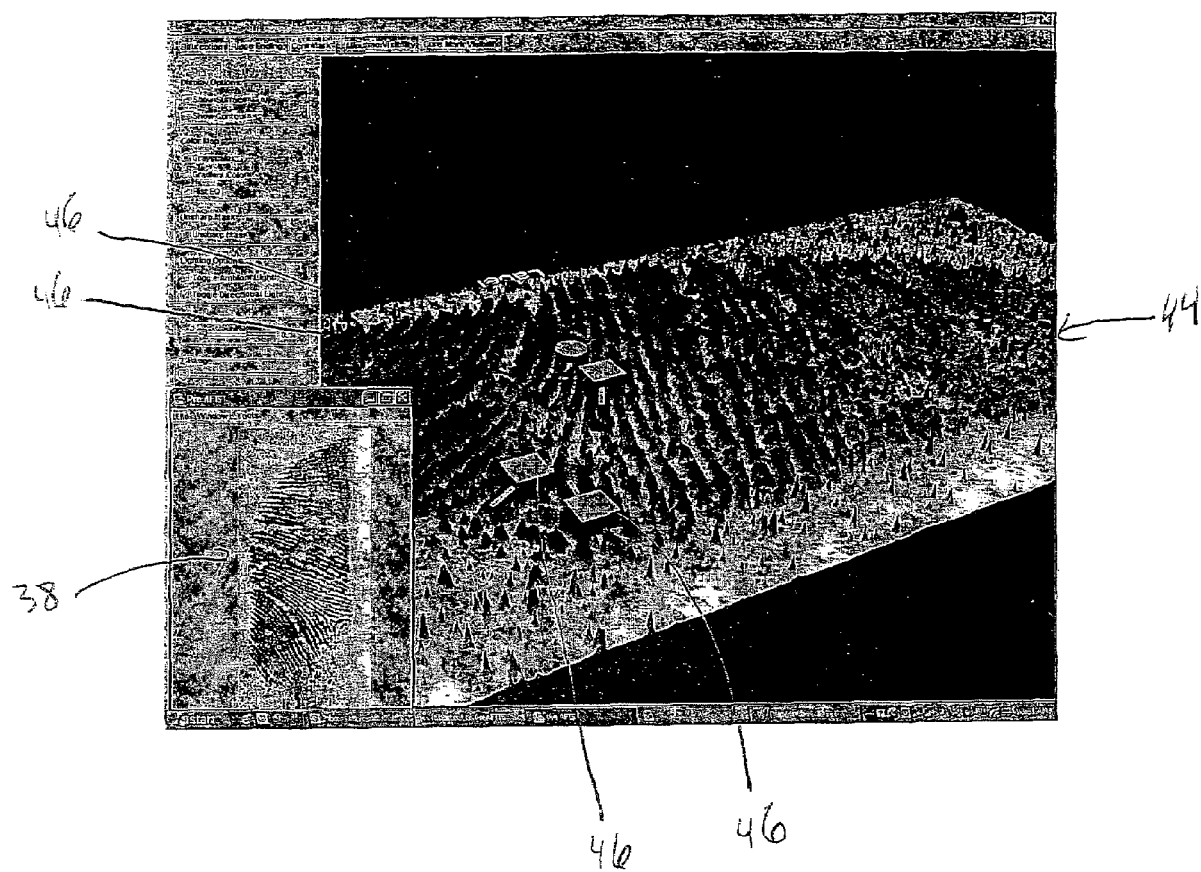
FIG. 11 depicts the same palm print image as FIG. 6 wherein a user has placed minutiae markers on the 3D surface that can be quantified and searched against existing 2D databases.

FIG. 11 depicts the same palm print image 38 as FIG. 6 wherein a user can also place minutia markers 46 on the 3D surface that will be quantified and searched against existing 2D databases.

Thus, in some embodiments the methods and related software and other systems herein comprise analyzing prints comprising: a) providing an at least 2-dimensional image of a print; b) subjecting the image to magnitude enhancement analysis such that at least one relative measurement across at least a substantial portion of the print can be depicted in an additional dimension relative to the at least 2-dimensions to provide a magnitude enhanced image such that additional levels of that magnitude can be substantially more cognizable to a human eye compared to the 2-dimensional image without the magnitude enhancement analysis; c) displaying the enhanced image; and d) manually reviewing the magnitude enhanced image to place at least one minutia marker on the print.

The placing can comprise identifying and placing at least one, two or more minutiae markers not previously identified on the print, and can comprise moving at least one, two or more minutiae markers previously, incorrectly placed on the print.

The methods can also comprise analyzing prints, comprising: a) providing an at least 2-dimensional image of a print comprising minutiae markers determined by an automated minutia marker algorithm to provide automated minutiae markers; b) subjecting the image to magnitude enhancement analysis such that at least one relative magnitude across at least a substantial portion of the print can be depicted in an additional dimension relative to the at least 2-dimensions to provide an magnitude enhanced image such that additional levels of the chosen measure or magnitude can be visible to a human eye compared to the 2-dimensional image without the magnitude enhancement analysis; c) displaying the enhanced image; and d) manually reviewing the magnitude enhanced image to evaluate the correctness of the automated minutiae markers. The methods can further comprise placing at least one minutia marker of the print, the placing comprising at least one of removing incorrect automated minutiae markers, moving incorrect automated minutiae markers, or adding further minutiae markers.

AFIS III+ Methods and Systems

When specific grayscale or other magnitudes in a fingerprint image are connected, the resulting pathway conforms to specific level III edge and pore ridge features. Using multiple grayscale or other magnitude pathways enhances the recognition and extraction of more, and sometimes substantially all, the level III features in an impression, thereby increasing the likelihood of an AFIS hit.

By connecting pixels which possess the same grayscale or other magnitude, a pathway or contour is formed. This pathway conforms to unique ridge shapes that are present along the edges, pores, and surface morphology of a friction ridge impression. The charted course and, generally, changes in the charted course of the pathway on the x-y axis can be used to recognize and extract level III features.

When a different grayscale value (or other value for the measured magnitude) is chosen, the pathway or contour takes on a new course. Changes in the charted new course will not be the same as changes in any other pathway course. In short, as the magnitudes used to chart the pathway change, the shape, location, prominence, and presence of features along that pathway also changes. If multiple magnitude pathways (multiple pathways within a given measurement indicator, such as grayscale, and/or multiple pathways within or between different magnitude indicators such as grayscale and hue and saturation) are used in an AFIS III+ environment, many, and possibly substantially all, features present in an impression may be recognized.

Figures 12, 12A, 12C:
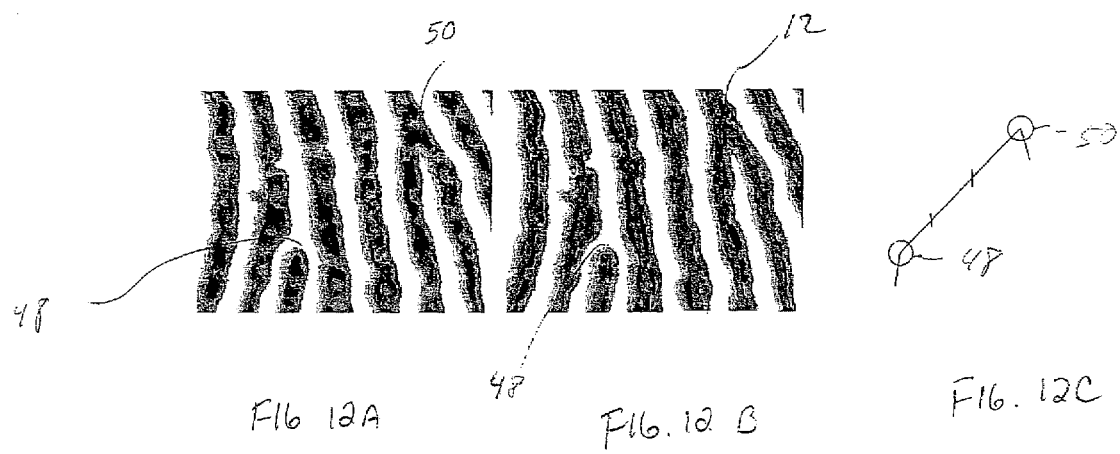
FIG. 12a depicts an image of a known print impression.
FIG. 12c depicts an AFIS II system recognizing and extracting level II detail with directionality and relationship.

Level II AFIS (AFIS II) models mainly take into account major friction ridge path deviations in an impression. These include bifurcations 48 and ridge endings 50, as demonstrated in FIGS. 12a-c. FIG. 12a (left) depicts an image of a known impression, FIG. 12b (center) shows an AFIS II system reading ridge paths and major ridge path deviations, then in FIG. 12c (right) recognizing and extracting level II detail with directionality and relationship.

Figures 13A, 13B, 13C:
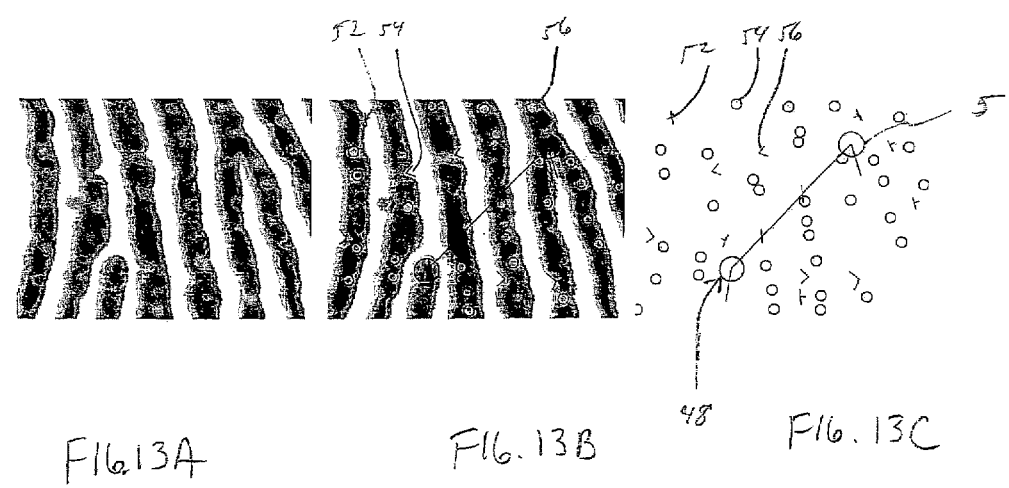
FIGS. 13a-c depict the same images as FIGS. 12a-c with AFIS level III detail demonstrated.

Level III AFIS (AFIS III) additionally takes into account features along the edge of a minor deviation such as a ridge positions 52, 54 and pore positions 56 along the center of a ridge, if available in the impression of the print. FIG. 13a (left) depicts an image of a known impression, FIG. 13b (center) shows an AFIS II system reading ridge paths and major ridge path deviations, then in FIG. 13c (right) recognizing and extracting level II detail with directionality and relationship.

Figure 14:
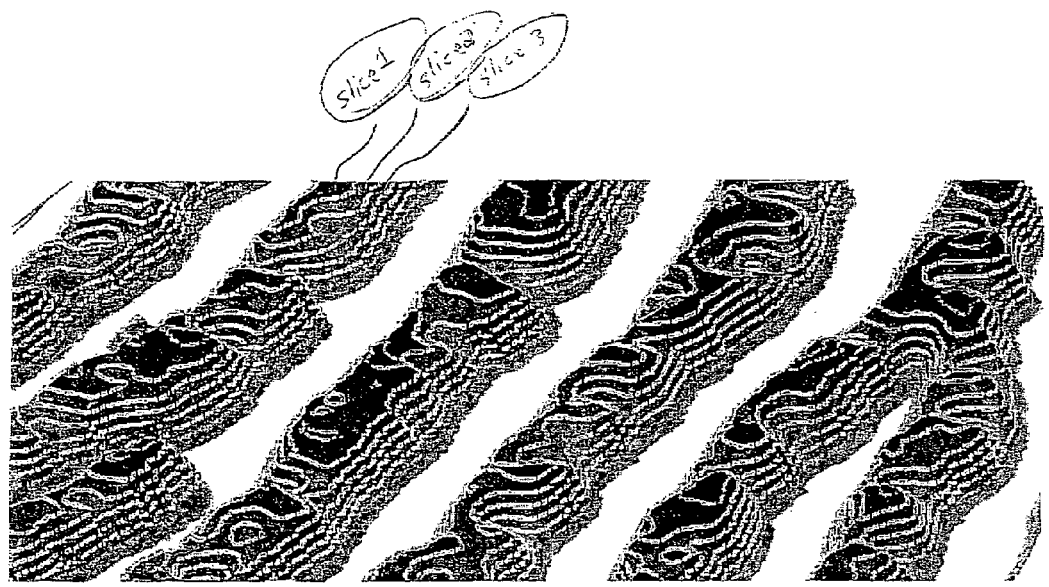
FIG. 14 depicts an AFIS III+ topographical analysis of a portion of the same print as in the images in FIGS. 12a-c at different grayscale magnitudes.

AFIS III+ takes into account this detail and more, at multiple levels or slices of an impression, as shown in FIG. 14. These slices are defined by the grayscale values that are used to chart the course of contours or pathways within the slice. Thus, FIG. 14, AFIS III+, utilizes slices comprising multiple image pathways which conform differently to level III features at different grayscale (or other) magnitudes.

Figures 15A, 15B, 15C:
FIGS. 15a-c depict an AFIS III+ analysis the same images as FIGS. 12a-c at different grayscale magnitudes.
Figures 16A, 16B, 16C, 17:
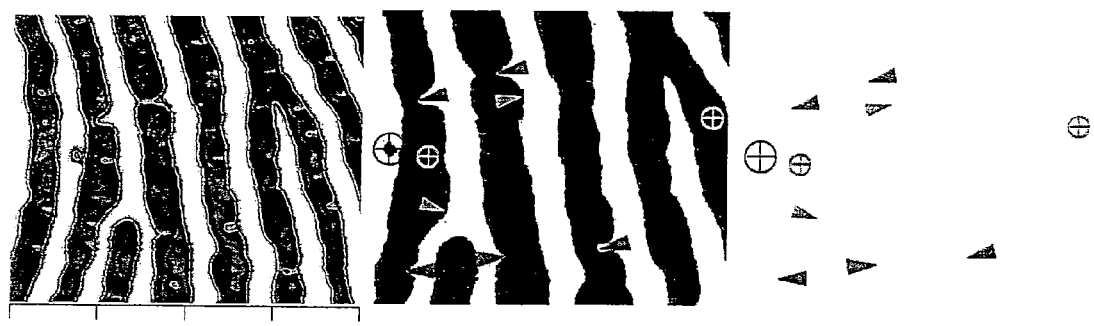
FIGS. 16a-c depict an AFIS III+ analysis the same images as FIGS. 12a-c at a different grayscale magnitude from the analysis in FIGS. 15a-c.
FIG. 17 is a table demonstrating the progressive nature of the combination of slices from multiple levels and multiple images.

As shown in FIGS. 15a-c and FIGS. 16a-c, these AFIS III+ pathways can be isolated and examined individually to demonstrate the uniqueness of the friction ridge that created the impression. FIGS. 15a-c depict an AFIS III+ analysis the same images as FIGS. 12a-c at different grayscale magnitudes; FIGS. 16a-c depict an AFIS III+ analysis the same images but at a different grayscale magnitude from the analysis in FIGS. 15a-c. By examining the course of the pathway and specifically, changes in the course of a pathway, unique features of that course can be recognized in the different slices (FIGS. 15b and 16b). By assigning value to changes in the course of a pathway, those unique features can be extracted and used for searching (FIGS. 15c and 16c). Thus, in FIGS. 15a and 16a, differing individual pathways are seen. In FIGS. 15b and 16b, features in the filled pathways (or slice) are recognized. In FIGS. 15c and 16c, only the marked features are shown (relationship, directionality, and prominence can be associated with each feature).

Thus, if the pathway or level in the print is charted according to a different grayscale or other magnitude, the position, location, prominence, and presence of features along the pathway changes.

By charting pathways based on a comprehensive set of grayscale values in an image, very large amounts the detail present can be recognized, extracted, and used in the comparison and identification of a fingerprint image. AFIS III+ results in a much more accurate and complete latent print feature-based profile, but that profile can require significantly more processing time and power to search. This is because the resulting feature set would contain many times more data than traditional level 2 AFIS systems capture. Further, this increased amount of data would be present on each slice of each image compared, and each slice would be compared with the multiple slices of known database images, as shown in FIG. 17.

Thus, in some embodiments only selected slices are used, or programs can be provided to compress data or otherwise facilitate data storage, management, processing, analysis, etc.

Turning to a more general discussion of this aspect of the innovations herein, one feature involves the use of multiple slices of a single image in an AFIS environment. Another aspect comprises the use of pathways defined by grayscale or other magnitudes within an image of a friction ridge impression. Once the pathways in each slice are determined, any extraction or matching algorithm may be used to gather and compare the data. Additional aspects comprise defining the features for recognition.

There are typically four types of level III features involving directional changes of grayscale magnitude pathways which can be present and quantified in an AFIS III+ environment.

Figure 18:
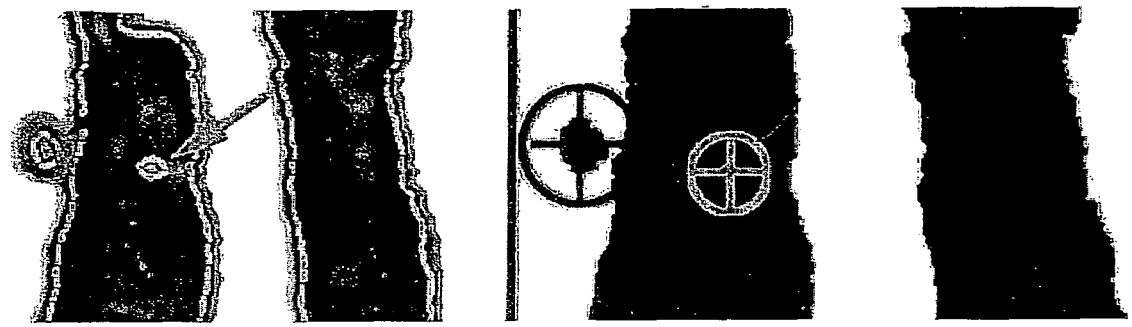
FIG. 18 depicts images comprising examples of a concave morphological feature and a convex morphological feature in an image of a print.

1) EC: point of maximum offset on a concave edge feature
2) EV: point of maximum offset on a convex edge feature
3) MC: center of mass of a concave morphological feature
4) MV: center of mass of a convex morphological feature A morphological feature is a feature in which a contour line or pathway forms a circuit around a level III feature. FIG. 18 shows examples of a concave morphological feature that may include a sweat pore, a depression in the top of a ridge or other morphological feature where detail is a lighter grayscale shade than the surrounding dark pixels. Examples of a convex morphological feature include an incipient ridge or a bump on a friction ridge where detail shows up as a darker grayscale shade than the surrounding light detail. In these Figures, the concave morphological features are of a lighter grayscale value, and the convex morphological features are of a darker grayscale value than surrounding detail.

Figure 19:
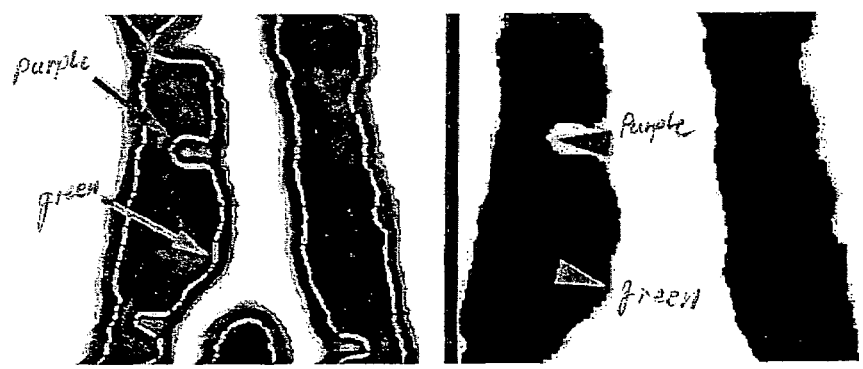
FIG. 19 depicts images comprising examples of a edge features in an image of a print.

As shown FIG. 19, edge features are features along the pathway proceeding down the edge of a friction ridge, represented by changes in direction of the pathway. Examples of a concave edge feature include an inlet of light (furrow) detail into a friction ridge or a sweat pore that is not quite closed in on one edge. Examples of a convex edge feature include a bump on the side of a ridge or a section of a ridge that protrudes into the furrow. In FIG. 19, the purple features are examples of concave edge features, and the green features are examples of convex edge features.

Recognition:

Through simple algebra or otherwise as desired, the location and direction of each feature can be determined and plotted in relation to the center of the pattern and other features on the x-y axis.

In the case of morphological features, center of mass and feature area can be calculated, and directionality can be assigned based on pixel grayscale magnitude relative to surrounding values. For example, convex features would receive a "+" value and convex features would receive a "−" value. Noise can be reduced by analysis of the prominence of the feature throughout multiple slices (subtle changes can be disregarded, or a threshold tolerance can be set). Noise can also be reduced by analysis of the percentage change of grayscale pixel magnitude in surrounding pixels (sharp changes would represent artificial features that are not friction ridge skin features).

For edge features, the point on a pathway that is furthest from the average path can be calculated, and directionality can be assigned based on pixel grayscale magnitude relative to the value on either side of the pathway. Convex features would receive a "+" value and concave features would receive a "−" value. Noise can be reduced by analysis of the deviation of the point from the average pathway (subtle changes can be disregarded, or a threshold of tolerance can be set). Noise can also be reduced by analysis of the frequency of features along a pathway (frequent features would represent artificial features that are not friction ridge skin features).

Turning to some general issues, the development of the innovations herein have the potential to significantly increase the accuracy of automated fingerprint identification systems, and/or increase the identification of more foreign and domestic criminals, thereby contributing to the advancement of law enforcement, criminal justice systems and homeland security efforts.

Virtually any dimension, or weighted combination of dimensions in an at least 2D digital image (e.g., a direct digital image, a scanned photograph, a screen capture from a video or other moving image) can be represented as at least a 3D surface map (i.e., the dimension or intensity of a pixel (or magnitude as determined by some other mathematical representation or correlation of a pixel, such as an average of a pixel's intensity and its surrounding pixel's intensities, or an average of just the surrounding pixels) can be represented as at least one additional dimension; an x,y image can be used to generate an x,y,z surface where the z axis defines the magnitude chosen to generate the z-axis). For example, the magnitude can be grayscale or a given color channel.

Other examples include conversion of the default color space for an image into the HLS (hue, lightness, saturation) color space and then selecting the saturation or hue, or lightness dimensions as the magnitude. Converting to an RGB color space allows selection of color channels (red channel, green channel, blue channel, etc.). The selection can also be of single wavelengths or wavelength bands, or of a plurality of wavelengths or wavelength bands, which wavelengths may or may not be adjacent to each other. For example, selecting and/or deselecting certain wavelength bands can permit detection of fluorescence in an image, or detect the relative oxygen content of hemoglobin in an image. The magnitude can be determined using, e.g., linear or non-linear algorithms, or other mathematical functions as desired.

Thus, the height of each pixel on the surface may, for example, be calculated from a combination of color space dimensions (channels) with some weighting factor (e.g., 0.5*red+0.25*green+0.25*blue), or even combinations of dimensions from different color spaces simultaneously (e.g., the multiplication of the pixel's intensity (from the HSI color space) with its luminance (from a YUV, YCbCr, Yxy, LAB, etc., color space)).

The pixel-by-pixel surface projections are in certain embodiments connected through image processing techniques to create a continuous surface map. The image processing techniques used to connect the projections and create a surface include mapping 2D pixels to grid points on a 3D mesh (e.g., triangular or rectilinear), setting the z-axis value of the grid point to the appropriate value (elevating based on the selected metric, e.g., intensity, red channel, etc.), filling the mesh with standard 3D shading techniques (gouraud, flat, etc.) and then lighting the 3D scene with ambient and directional lighting. These techniques can be implemented for such embodiments using modifications in certain 3D surface creation/visualization software, discussed for example in U.S. Pat. Nos. 6,445,820 and 6,654,490; U.S. patent application 20020114508; 20020176619; 20040096098; 20040109608; and PCT patent publication No. WO 02/17232.

The present invention can display 3D topographic maps or other 3D displays of color space dimensions in images that are 1 bit or higher. For example, variations in hue in a 12 bit image can be represented as a 3D surface with 4,096 variations in surface height.

Other examples of magnitude and/or display option include, outside of color space dimensions, the height of a gridpoint on the z axis can be calculated using any function of the 2D data set. A function to change information from the 2D data set to a z height takes the form f(x, y, image)=z. All of the color space dimensions are of this form, but there can be other values as well. For example, a function can be created in Lumen software that maps z height based on (i) a lookup table to a Hounsfield unit (f(pixelValue)=Hounsfield value), (ii) just on the 2D coordinates (e.g., f(x,y)=2x+y), (iii) any other field variable that may be stored external to the image, or (iv) area operators in a 2D image, such as Gaussian blur values, or Sobel edge detector values.

In all cases, the external function or dataset is related in some meaningful way to the image. The software herein can contain a function g that maps a pixel in the 2D image to some other external variable (for example, Hounsfield units) and that value is then used as the value for the z height (with optional adjustment). The end result is a 3D topographic map of the Hounsfield units contained in the 2D image; the 3D map would be projected on the 2D image itself.

Thus, the magnitude can be, for example, at least one or more of grayscale, hue, lightness, or saturation, or the magnitude can comprise a combination of magnitudes derived from at least one of grayscale, hue, lightness, or saturation, an average defined by an area operator centered on a pixel within the image. The magnitude can be determined using a linear or non-linear function.

The methods can also comprise performing one or more of AFIS II-type, AFIS III-type and/or AFIS III+-type analyses of the markers in the image.

The at least 2-dimensional image of a print can be a 2-dimensional image and the additional dimension relative to the 2-dimensions can be a third dimension, to provide a 3D image having a 3-dimensional surface with the two dimensions of the 2-dimensional image represented on the x, y axes and the third dimension represented on the z-axis.

The magnitude analysis can differentiate sufficient levels of the value to distinguish level III characteristics of the print. The magnitude enhancement analysis can be a dynamic magnitude enhancement analysis, and can comprise rolling, tilting and/or panning the image. The dynamic analysis can also comprise incorporating the dynamic analysis into a cine loop, which indicates a video or other moving picture wherein a particular roll, tilt or pan is reiterated back and forth; other options for the cine loop include varying the aspect ratio of the surface from 0 to some other number (positive or negative), varying the lighting parameters (e.g., the % mix of ambient and directional light), the angle of the directional lighting applied to the surface ("sweeping" the lights over the surface), etc. The image can be a digital image, photographic image, color image, or black and white image. The print can be a fingerprint, palmprint, partial print, latent print.

The methods further can comprise, upon placing the minutia marker of the print, simultaneously displaying the minutia marker on both a 2D image and a 3D image of the print. The 2D image and the 3D image of the print can be simultaneously displayed on a single display screen.

The innovations herein also comprise computer-implemented programming that performs the automated elements of the methods, and computers comprising such computer-implemented programming. The computers can comprise a distributed network of linked computers, such as a handheld wireless computer, and the methods can be implemented on the handheld wireless computer. The innovations also comprise an AFIS system comprising computers and/or computer-implemented programming that performs the methods herein.

In some embodiments, the image data modeling programs herein keep a persistent record, or command history, of every command performed on the original data set. To return to a previous view of the surface object, the corresponding command is selected from the command history drop down list, or via other mechanisms, such as striking the "undo/redo" command key several times, or otherwise as desired. When a magnitude enhanced image is saved, the command history, and the current position in the history, is saved as part of the image file format or other inextricably linked format. Such saving of the command history can be automatic or manual, and can be mandatory or optional. For example, where the forensic history and/or chain of custody of the sample (and tests on the sample) are desirable, such as in the review of evidence for presentation in court proceedings, the command history can be maintained as a mandatory (i.e., can't be turned off by the user), automatic feature that records every image manipulation for later review by opposing attorneys or experts, or other authorities. Similarly, in corporate settings where employee actions need to be tracked, the command history can be mandatory. In other settings, where verifiable history is not critical or desired, the command history function can either be turned off or can be erased. It is a feature of desired embodiments that the command history can never be "faked."

In some embodiments, the saved command history will automatically appear, and can be applied in the same sequenced order, whenever the saved data modeling file is opened. Thus, the command history is "persistent", in that it remains part of each visualization file that is saved in the data modeling file after commands have been entered.

Once the command history is saved, the history by itself or with a copy of the image can be mailed to another user, who can then import it or otherwise access it, and use the saved command set on the same underlying image. This generates an identical visualization(s) without actually having to send the visualization(s) back and forth. This can be advantageous, for example, where a crime lab wants an outside expert to look at an image using the image modeling system, but ultimately wants the rendered visualization to be done in-house or does not have the capacity to readily transmit or accept very large computer files (or a series of such files). It also enhances the ability of the second user(s) to cross-check the methodology used by the original user. Thus, the image can be examined by one user to achieve a desired magnitude analysis, a pitch, roll and yaw, and/or other display settings to yield a desired enhanced image visualization, and then the command history providing such desired enhanced image visualization can be transmitted, for example by e-mailing, to the second user. They can then bring up the same underlying image in the software installed on their computers or otherwise, plug in or copy the command history sent them, and create the exact same rendering. Additional renderings can also be then be made, and sent back to the original user or on to other users as desired. In some embodiments, the first user is a central resource, such as the provider of the image modeling software, that has particular expertise in the examination of the image or of the type of image. In other embodiments, the users can be a plurality of different crime labs, medical labs, pathologists, or other users having a specific expertise area but not specifically tied to the image modeling software. Other users are also possible as desired.

In another aspect, prints and other images discussed herein can be advantageously displayed such that images with 9-bit or more magnitudes for each pixel channel information can be displayed on 8-bit or less display systems. Tools that can be included in such methods and software, etc., include surface/wireframe/contour/grid point mapping, contour interval controls, elevation proportions and scaling, pseudocolor/grayscale mapping, color/transparency mapping, surface orientation, surface projection perspectives, close-up and distant views, comparison window tiling and synchronization, image registration, image cloning, color map contrast control by histogram equalize and linear range mapping. The systems, etc., transform grayscale image intensity, other magnitudes, to a 3D surface representation of the magnitude. The transformation results in a fundamental shift of HVS perception mechanisms, where tonal values are transformed into "elevation" shapes and forms corresponding to the chosen magnitude of the respective pixel. The elevation shapes and forms can be represented at any chosen contrast levels or hues, avoiding grayscale tonal display and HVS perception issues. A variety of interactive tools and aids to quantitative perception can be used, such as zoom, tilt, pan, rotation, applied color values, isopleths, linear scales, spatial calibration, and mouse gesture measurement of image features.

The systems, etc., provide methods of displaying grayscale shades of more than 8 bits (more than 256 shades) and higher (16 bit, 65,536 shades for example) on conventional display equipment, typically capable of a maximum of 8 bit grayscale discrimination. This is done in some embodiments by mapping the digitized magnitude image spatial information on the X and Y axes of the image while plotting the grayscale value on a Z-axis or elevation dimension. The resulting three dimensional surface can assign any desired length and scale factor to the Z-axis, thus providing display of grayscale information equal to or exceeding the common 256 grayscale limitation of printers, displays, and human visual perception systems.

Additionally, subsets of the full bit set of information (i.e., completely uncompressed, or at least less compressed than the remainder of the magnitude information) can be displayed in a "magnification window" such that only certain segments of the information are fully displayed while the remainder is compressed or even "left off" the display screen. For example, the "window" can be a subset of the overall grayscale range, 256 of 4096 for example. This "window" may be located to view grayscale values at midtone "level" (1920 to 2176), extremely dark "level" (0 to 255), or elsewhere along the 4096, 12 bit scale. For the extremely dark example, a 256 grayscale portion (window) of extremely dark (level) grayscales from the 4096 or other high bit level image, would be adjusted to display those dark grayscales using midtone level grayscales readily visible to the HVS on common display equipment. The balance of 3840 grayscales (4096 minus 256) in the 12 bit image would not be visible on the display. By use of an optional 3 dimensional surface, the extremely dark shades are visible without adjustment (window and level), as well as the midtone and extremely light shades of gray. All 4096 grayscale values will be available for HVS perception at one moment (or more, if desired) as 3D surface object.

Moreover, certain of the surface creation techniques, persistent command history, display options, software, etc., discussed above and elsewhere herein themselves constitute innovations herein, including for purposes other than AFIS analyses. For example, such techniques, etc., can be useful in medical, industrial, dental, forensic, quality assurance, personal identification, etc., situations.

All terms used herein, including those specifically discussed below in this section, are used in accordance with their ordinary meanings unless the context or definition clearly indicates otherwise. Also unless indicated otherwise, except within the claims, the use of "or" includes "and" and vice-versa. Non-limiting terms are not to be construed as limiting unless expressly stated, or the context clearly indicates, otherwise (for example, "including," "having," and "comprising" typically indicate "including without limitation"). Singular forms, including in the claims, such as "a," "an," and "the" include the plural reference unless expressly stated, or the context clearly indicates, otherwise.

A "computer" is a device that is capable of controlling a scanner, digital image analyzer, or processor or the like, or other elements of the apparatus and methods discussed herein. For example, the computer can control the AFIS analysis, the software discussed herein that determines the grayscale or other magnitude and/or intensity slices, etc. Typically, a computer comprises a central processing unit (CPU) or other logic-implementation device, for example a stand alone computer such as a desk top or laptop computer, a computer with peripherals, a handheld, a local or internet network, etc. Computers are well known and selection of a desirable computer for a particular aspect or feature is within the scope of a skilled person in view of the present disclosure.

The scope of the present systems and methods, etc., includes both means plus function and step plus function concepts. However, the terms set forth in this application are not to be interpreted in the claims as indicating a "means plus function" relationship unless the word "means" is specifically recited in a claim, and are to be interpreted in the claims as indicating a "means plus function" relationship where the word "means" is specifically recited in a claim. Similarly, the terms set forth in this application are not to be interpreted in method or process claims as indicating a "step plus function" relationship unless the word "step" is specifically recited in the claims, and are to be interpreted in the claims as indicating a "step plus function" relationship where the word "step" is specifically recited in a claim.

From the foregoing, it will be appreciated that, although specific embodiments have been discussed herein for purposes of illustration, various modifications may be made without deviating from the spirit and scope of the discussion and claims herein.

What is claimed is:

1. A method of analyzing prints comprising:
    a) providing an at least 2-dimensional image of a print;
    b) subjecting the image to magnitude enhancement analysis such that at least one relative magnitude across at least a substantial portion of the print is depicted in an additional dimension relative to the at least 2-dimensions to provide a magnitude enhanced image such that additional levels of magnitudes are substantially more cognizable to a human eye compared to the 2-dimensional image without the magnitude enhancement analysis;
    c) displaying the magnitude enhanced image; and,
    d) automatically directionally lighting the magnitude enhanced image such that at least one lighting angle for the magnitude enhanced image different from ambient light is provided, to provide a directionally lit magnitude enhanced image.

2. The method of claim 1 wherein the directionally lighting the magnitude enhanced image comprises sweeping at least one lighting angle across the magnitude enhanced image.

3. The method of claim 1 wherein the directionally lighting the magnitude enhanced image comprises sweeping at least one lighting angle around the magnitude enhanced image.

4. The method of claim 1 wherein the directionally lighting further comprises applying at least one filter configured to enhance contrast within the image.

5. The method of claim 1 wherein the analyzing further comprises histogram equalization.

6. The method of claim 1 wherein the analyzing further comprises manually reviewing the directionally lit magnitude enhanced image to place at least one minutiae marker of the print.

7. The method of claim 1 wherein the analyzing further comprises manually reviewing the magnitude enhanced image to evaluate the correctness of automated minutiae markers present in the print.

8. The method of claim 7 wherein the method further comprises determining at least one minutia marker of the print in the directionally lit magnitude enhanced image, the determining comprising at least one of removing incorrect automated minutiae markers, moving incorrect automated minutiae markers, or adding further minutiae markers.

9. The method of claim 1 wherein the magnitude is grayscale.

10. The method of claim 1 wherein the magnitude comprises at least one of hue, lightness, or saturation.

11. The method of claim 1 wherein the magnitude comprises a combination of values derived from at least one of grayscale, hue, lightness, or saturation.

12. The method of claim 1 wherein the magnitude comprises an average intensity defined by an area operator centered on a pixel within the image.

13. The method of claim 1 wherein the method further comprises performing AFIS II-type analysis of the markers in the image.

14. The method of claim 1 wherein the method further comprises performing AFIS III-type analysis of the markers in the image.

15. The method of claim 1 wherein the at least 2-dimensional image of a print is a 2-dimensional image and the additional dimension relative to the 2-dimensions is a third dimension, to provide a 3D image having a 3-dimensional surface where the two dimensions of the 2-dimensional image are represented on the x, y axes and the third dimension is represented on the z-axis.

16. The method of claim 15 wherein the magnitude analysis differentiates sufficient levels of the magnitude to distinguish level III characteristics of the print.

17. The method of claim 15 wherein the magnitude enhancement analysis is a dynamic magnitude enhancement analysis.

18. The method of claim 17 wherein the dynamic analysis comprises at least rolling, tilting and panning the image.

19. The method of claim 18 wherein the dynamic analysis comprises incorporating the dynamic analysis into a cine loop.

* * * * *